United States Patent [19]
Vdoviak et al.

[11] 3,747,855
[45] July 24, 1973

[54] PROPULSION NOZZLES

[75] Inventors: John William Vdoviak, Marblehead, Mass.; Donald John Dusa, Cincinnati, Ohio

[73] Assignee: General Electric Company, Lynn, Mass.

[22] Filed: Mar. 1, 1972

[21] Appl. No.: 230,840

[52] U.S. Cl. .................... 239/265.29, 239/265.41
[51] Int. Cl. ............................................ B64c 15/04
[58] Field of Search .................. 239/265.29, 265.39, 239/265.41, 265.37

[56] References Cited
UNITED STATES PATENTS

| 3,524,588 | 8/1970 | Duval | 239/265.29 X |
| 3,610,533 | 10/1971 | Johnson et al. | 239/265.37 X |
| 3,432,100 | 3/1969 | Hardy | 239/265.29 X |
| 3,346,193 | 10/1967 | Tumicki | 239/265.41 X |
| 3,347,467 | 10/1967 | Carl et al. | 239/265.37 |

Primary Examiner—M. Henson Wood, Jr.
Assistant Examiner—John J. Love
Attorney—Edward S. Roman et al.

[57] ABSTRACT

A propulsion nozzle is disclosed in combination with a gas turbine engine. The nozzle is of the variable geometry, convergent-divergent type adapted for both subsonic and supersonic operation. The nozzle is also of the two stage ejector type, selectively utilizing tertiary, or ambient, air during subsonic operation. A variable ejector is provided between the convergent and divergent portions of the nozzle. The variable ejector provides a positive expanson surface during supersonic operation and facilitates introduction of secondary and tertiary air during subsonic operation for improved efficiency. The variable ejector may be displaced in a downstream direction and its flaps swung inwardly to block the hot gas stream discharge of the gas turbine engine, for reverse thrut.

7 Claims, 5 Drawing Figures

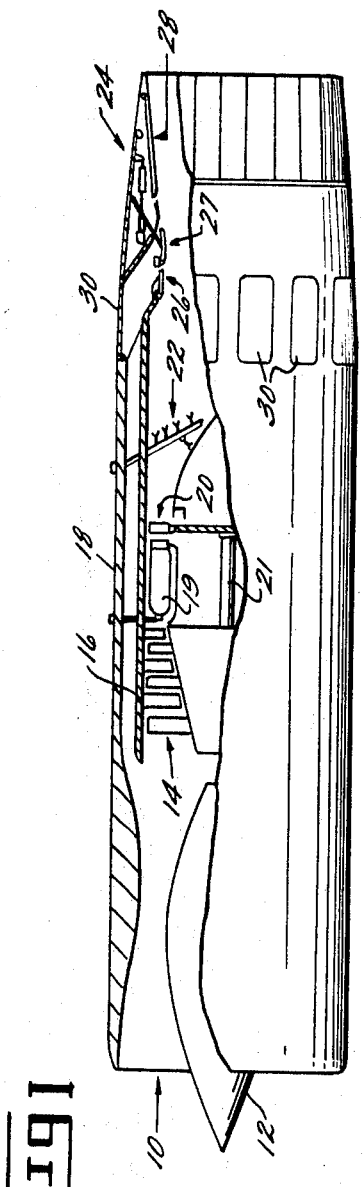
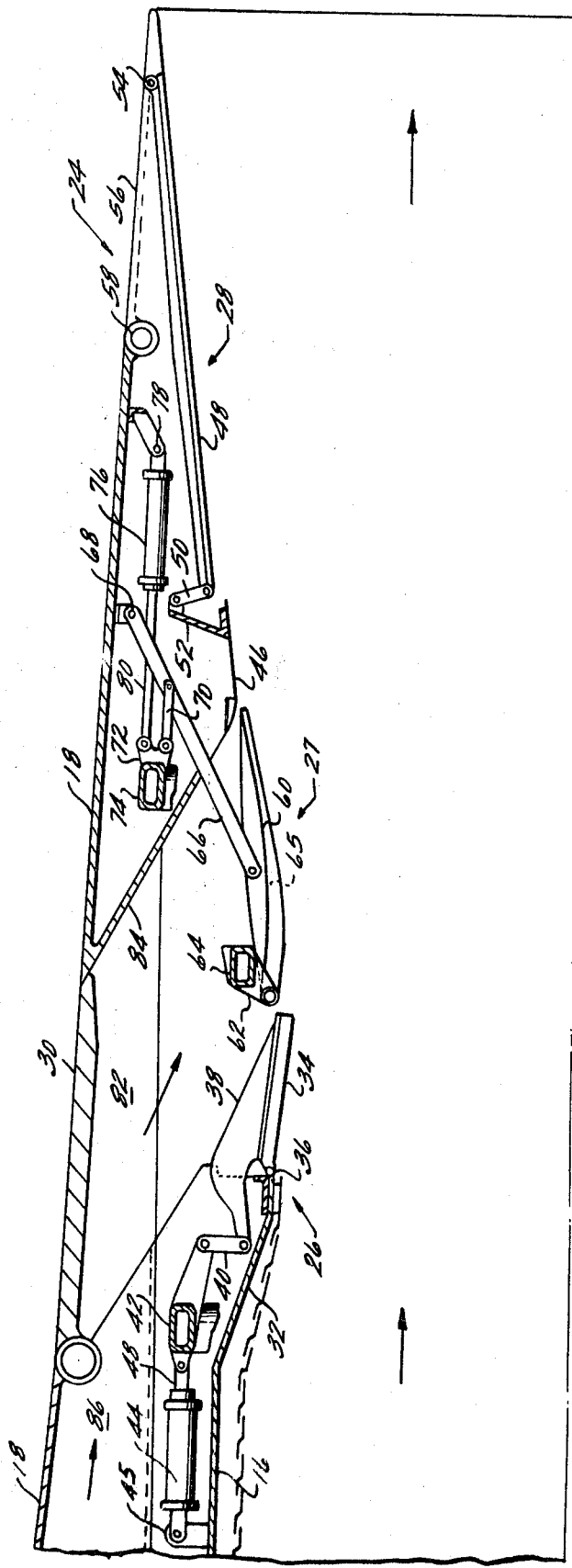

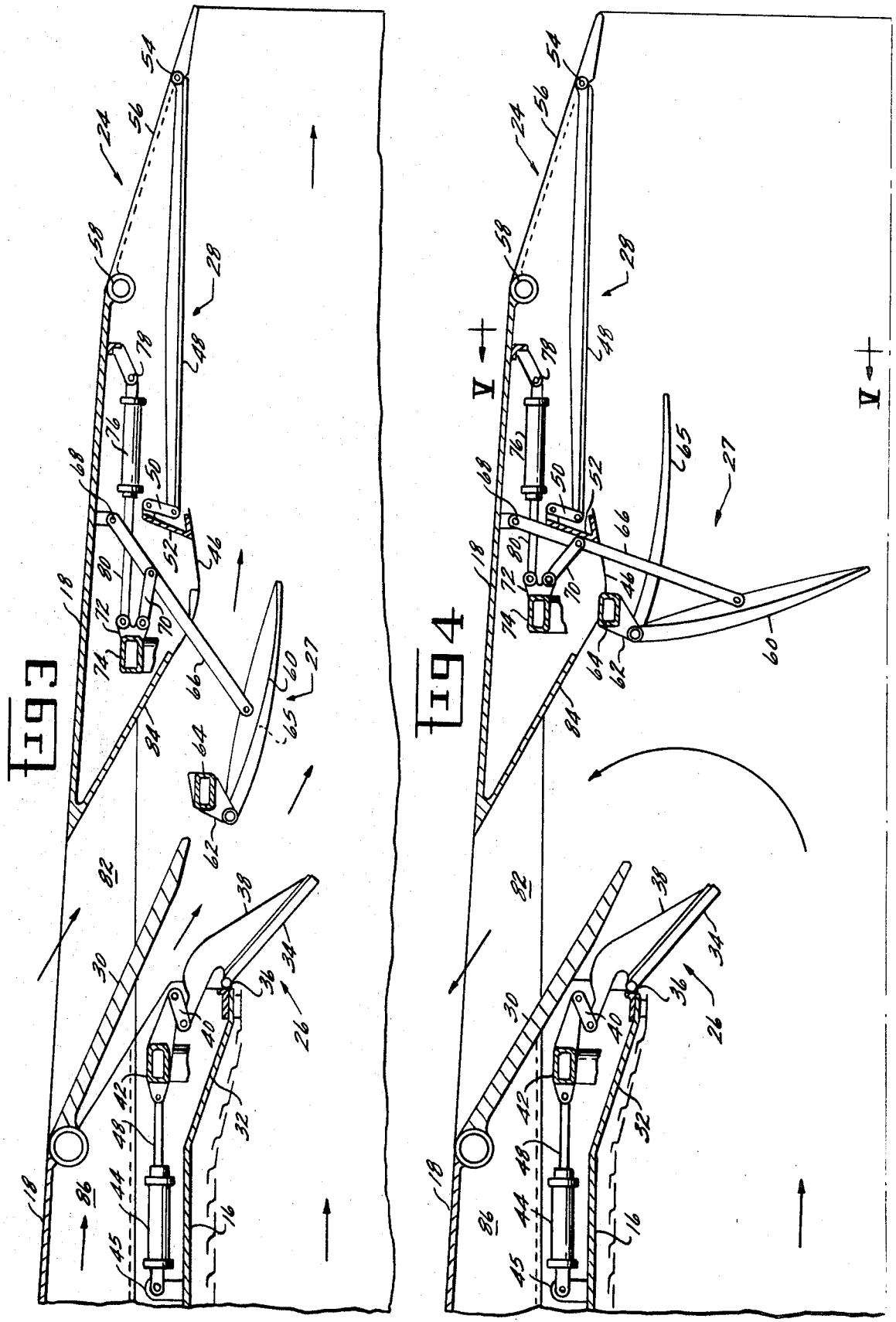

PROPULSION NOZZLES

The invention described and claimed herein resulted from work done under U.S. Government Contract FA-SS-67-7. The U.S. Government has an irrevocable, non-exclusive license to practice and have practiced the invention claimed herein, including the unlimited right to sublicense others to practice and have practiced the claimed invention for any purpose whatsoever.

The present invention relates to improvemnts in propulsion nozzles through which a motive fluid stream is discharged to power both subsonic and supersonic flight.

Propulsion nozzles for supersonic flight are necessarily of the convergent-divergent type. Design parameters to establish the configuration, or flow path, of such a nozzle for a given set of conditions are well known. Any such design can give a theoretical, optimum efficiency of the nozzle at the design point for which the conditions are established. However, propulsion efficiency decreases when the nozzle is operated at conditions other than those established for the design point, particularly when there is a reduction to subsonic operation. For economical aircraft operation on many flight missions, subsonic operation may be of equal or greater importance to supersonic operation, where the latter capability is a requirement.

There are two basic aspects to this problem. The first relates to variations within the two modes of operation which require area changes within the nozzle structure. For the most part this problem has been overcome by forming major portions of the nozzle from pivotable flaps, commonly referenced as variable geometry, which can be swung and positioned to control areas approximately to desired values. The second aspect is more fundamental since the divergent portion of the nozzle, required for supersonic operation, is essentially a handicap in subsonic operation where a simple convergent nozzle exhausting to atmosphere is most efficient. While there have been several proposals for overcoming this second problem, the so-called two stage ejector nozzle has generally proven to be most attractive. In this type of nozzle the divergent, or secondary portion, is spaced downstream and somewhat outwardly from the convergent, or primary portion. During subsonic operation tertiary, or ambient, air is introduced through blow in doors into this spacing, along with secondary air, from the engine inlet, to the end that the divergent portion of the nozzle is aerodynamically neutralized. During supersonic operation the tertiary air is shut off and the secondary air is utilized to aerodynamically form an expansion surface between the convergent portion of the nozzle and the downstream-spaced divergent portion thereof.

While variable geometry, per se, has been relatively effective, the conventional two stage ejector nozzle has failed to achieve desired levels of efficiency, particularly in supersonic operation. At this point it should be noted that of all components of a propulsion system, the nozzle and its efficiency are perhaps most critical in the overall gains that can be obtained from increases that approach optimum.

Another problem associated with propulsion nozzles, particularly for commercial aircraft, is the provision of reverse thrust as is normally required in landing. Where supersonic capabilities are a requirement, this problem is further complicated by the structure necessary for different modes of flight operation as discussed above.

Accordingly, one object of the present invention is to improve the overall efficiency of variable geometry, two stage ejector type nozzles, as referenced above, and particularly to improve the efficiency of such nozzles during operation at supersonic conditions.

Another object of the present invention is to attain the above ends and further to provide a reverse thrust capability.

Yet another object of the present invention is to attain the above ends, both individually and collectively, and also to do so in a simple, effective and economical manner.

In the broader aspect of the invention, these ends are attained by the provision of a variable ejector comprising an intermediate set of pivotable flaps disposed between the conventionally spaced, convergent and divergent portions of the referenced type nozzle. During supersonic operation, these flaps are generally aligned with the divergent secondary nozzle and, being closely adjacent the primary nozzle portion, they provide a positive reaction surface for the motive fluid stream. This minimizes reliance on aerodynamically provided reaction surfaces. During subsonic operation, these flaps are swung inwardly to facilitate the introduction of secondary and tertiary air along their inner surfaces, as well as along the inner surfaces of the secondary nozzle portion, to thereby effectively neutralize the secondary nozzle portion in an aerodynamic fashion. In both modes of operation efficiency is improved.

Additionally provision is made to translate the variable ejector in a downstream direction and swing a portion of its flaps inwardly to block the hot gas stream. The hot gas stream is thus deflected laterally and outwardly of the nozzle, being discharged through the blow in door openings, to provide reverse thrust, as is required in the landing of an aircraft.

The above and other related objects and features of the invention will be apparent from reading of the following description of the disclosure found in the accompanying drawings and the novelty thereof pointed out in the appended claims.

In the drawings:

FIG. 1 is a schematic representation, partly in section, of a gas turbine engine and a propulsion nozzle embodying the present invention;

FIG. 2 is an enlarged, longitudinal section of a portion of the propulsion nozzle seen in FIG. 1, the nozzle being positioned for supersonic operation;

FIG. 3 is a section similar to that of FIG. 2, illustrating the position of the nozzle for subsonic operation;

FIG. 4 is a section similar to that of FIG. 2, illustrating the position of the nozzle to produce reverse thrust.

Figure 5:
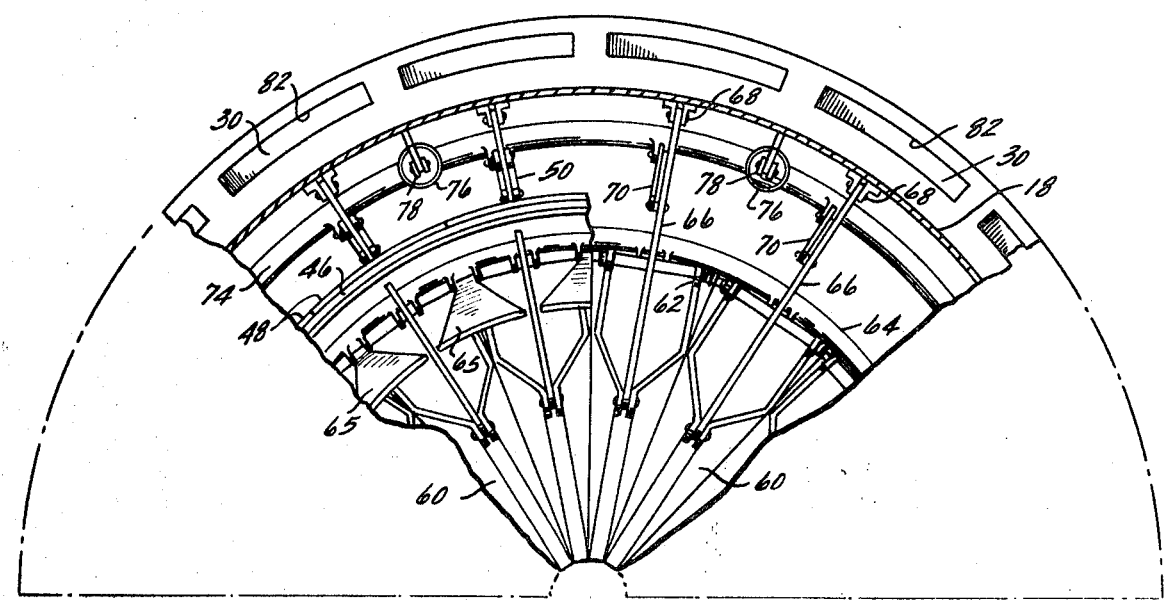
FIG. 5 is a section taken genrally on line V—V in FIG. 4.

FIG. 1 briefly illustrates a gas turbine engine coupled to a nozzle providing supersonic propulsion capability. Air enters the engine inlet 10 which includes an axisymetrical spike 12. The majority of the air is further pressurized by a compressor 14. A small percentage of the inlet air bypasses the compressors as "secondary air," flowing through a passageway in the space between the engine casing 16 and an outer casing or pod 18. The secondary air flows downstream to be employed for purposes later referenced. The air pressurized by the compressor 14 supports combustion of fuel in a combustor 19, in the generation of a hot gas, or motive fluid, stream. A portion of the energy of this hot gas stream drives a turbine 20 which is connected to the rotor of the compressor 14 by a shaft 21. The hot gas stream discharged from the turbine 20 may be augmented by the combustion of further fuel in an afterburner 22. The hotas stream is then discharged through a propulsion nozzle 24 which comprises convergent, primary nozzle 26, a variable ejector 27 and a divergent, secondary nozzle 28. These nozzles and the variable ejector are of the variable geometry type and will be described in greater detail later.

In operation, the hot gas stream is usually augmented only where relatively high thrust output is required. The discharge areas of the primary and secondary nozzles, as well as the variable ejector, are varied in area to match the performance conditions of the engine in operation. Further, in subsonic operation particularly, it is desirable that ambient, or tertiary, air be introduced into the interior of the nozzle. This function is provided by blow in doors 30 which are spaced around the exterior of the pod 18 adjacent the upstream end of the secondary nozzle. When tertiary air is required, these doors swing inwardly permitting the tertiary air to flow inwardly through passageways leading to the interior of the nozzle.

Additionally referencing FIG. 2, a more detailed description of the propulsion nozzle 24 will be given. The primary nozzle 26 comprises a convergent duct section 32 of the engine casing 16. A plurality of flaps 34 are pivotally mounted at the downstream end of the convergent section 32, at 36. The flaps 34 may be alternated with sealing flaps (not shown) to form continuous surfaces they are swung about the pivot 36, this being a well known feature to those skilled in the art. Arms 38 project from the outer surfaces of the flaps 34 and are connected, by links 40, to an actuation ring 42. A plurality of actuators 44 (one is shown) are spaced around the casing 16, being pivotally mounted on lugs 45 projecting therefrom. The rods 48 of the actuators 44 are connected to the actuation ring 42. The actuators 44 are simultaneously pressurized to displace the actuation ring in a fore and aft direction to pivot the flaps 34 and vary the discharge area of the primary nozzle 26.

The secondary nozzle 38 may also be of conventional construction, comprising a fixed section 46 formed as part of the structure of the pod 18. Inner flaps 48, having their upstream ends connected by links 50 to fixed brackets 52, are mounted on the pod structure. The downstream ends of the flaps 48 are pivotally connected, at 54, to outer flaps 56, which in turn are pivotally connected, at their upstream ends, to the outer pod structure, at 58. The aerodynamic forces acting on the flaps 48 and 56 position these flaps for efficient operation in a known manner. However, it is to be understood that the present invention is in no way limited in its utility to an aerodynamically positioned secondary nozzle as described.

The variable ejector 27 comprises flaps 60 pivotally mounted, at their upstream ends, on lugs 62 projecting from an actuation ring 64. a floating seal flap 65, also pivoted at its upstream end, is mounted on the brackets 62, between each of the ejector flaps 60, to form a continuous surface when the ejector is positioned for supersonic and subsonic operation. Each of the flaps 60 is connected to the inner end of a link 66, the outer end of which is pivotally mounted, at 68, on the pod structure. Shorter links 70 connect each of the links 66 to lugs 72 which are spaced around a unison ring 74. A plurality of actuators 76 (see also FIG. 5) are pivotally mounted, at 78, on the pod structure. The rods 80 of the actuators 76 are pivotally connected to the unison ring lugs 72. It will be apparent that extension and retraction of the actuator rods 80 will displace the actuation ring 64 in an axial direction, relative to the nozzle 24, and simultaneously pivot the flaps 60 relative thereto. The actuators 76, for the variable ejector 27, as well as the actuators 44 for the primary nozzle 26, are controlled by the engine control system (not shown) in accordance with the desired operation of the engine and the aircraft propelled thereby.

FIG. 2 illustrates the overall nozzle configuration for maximum power during supersonic operation. The actuators 44 have positioned the flaps of the primary nozzle 26 so that a maximum area opening is provided. The secondary nozzle 28 is aerodynamically positioned for maximum divergence and maximum discharge area. The actuators 76 have positioned the flaps 60, and the flaps 65 are aerodynamically positioned thereagainst, so that the variable ejector 27 diverges from the primary nozzle 26 in substantial alignment with the secondary nozzle 28. Further, in this mode of operation, the blow in doors 30 are closed.

It will be apparent that, in the described configuration of FIG. 2, the variable ejector 27 forms a part of the expansion surface for the motive fluid stream upon its discharge from the primary nozzle 26 and, overall, there is provided a nozzle which closely approximates the ideal convergent-divergent configuration which is optimum for supersonic operation. The discontinuities in the flow defining surfaces (at the upstream and downstream ends of the variable ejector 27) are relatively minor. These discontinuities serve the desirable, if not necessary, function of providing for the introduction of secondary air to cool the inner surfaces of the variable ejector 27 and secondary nozzle 28, against which the motive fluid stream is expanded to attain supersonic velocities. The secondary air so introduced also serves to aerodynamically span these discontinuities so that an optimum configuration is closely approximated.

FIG. 3 illustrates the configuration of the nozzle 24 for subsonic operation. The actuators 44 have positioned the flaps 34 to provide a reduced discharge area for the primary nozzle 26, the actual area being a function of parameters well known to those in the art. The secondary nozzle 28 is aerodynamically positioned so that its inner flaps 48 are essentially parallel to the axis of the nozzle. The blow in doors 30 are swung inwardly, as shown, permitting flow of tertiary air through the passageways indicated at 82. The flaps 60 are positioned by the actuators 76, and the flaps 65 are aerodynamically positioned thereagainst, so that the variable ejector 27 is positioned with its upstream end generally aligned with the inner ends of the blow in doors 30 and is somewhat convergent so that the tertiary air will be turned and flow generally parallel to the motive fluid stream along the secondary nozzle 28. The nozzle 24 now provides efficient subsonic operation as a simple convergent nozzle. Secondary air, guided along the inner surfaces of the variable ejector 27, and tertiary air, guided by the outer surfaces of the variable ejector, essentially neutralize the secondary nozzle 28 as well as the variable ejector itself. Such neutralization is accomplished aerodynamically and permits the primary nozzle 26 to function as if it were an independent component.

The overall nozzle configuration may be optimized for given parameters of supersonic and subsonic operation, respectively, with emphasis given to one mode of operation or the other as desired. The variable geometry of the primary and secondary nozzles, as well as that of the variable ejector, enables intermediate positioning of these components so that losses at other operating conditions are greatly minimized.

As will be seen from FIGS. 4 and 5, the nozzle 24 also has the capability of providing reverse thrust through the expendient of utilizing actuators 76 having a relatively long stroke. Thus full retraction of the actuator rods 80 produce the combined action of displacing the actuation ring 64 in a downstream direction to sealingly engage the fixed portion 46 of the secondary nozzle 28 and at the same time swinging the flaps 60 inwardly to provide substantially complete blockage of the normal motive fluid stream, flow path. The flaps 65, as previously indicated, are free floating, outwardly of the flaps 60. This permits the flaps 60 to be swung to the illustrated blocking position, with the flaps 65 suspended in an outer position. The motive fluid stream, when thus blocked, is diverted laterally and outwardly of the nozzle 24, through the blow in door passageways 82. These passageways are defined, fore and aft, by the inwardly swung doors 30 and panels 84, so that a forwardly angled vector is imparted to the motive fluid stream discharged therefrom. This provides greater efficiency for reverse thrust operation.

Dependent upon a particular aircraft installation, the motive fluid stream may be discharged through all or a selected number of tertiary air passageways 82 during reverse thrust operation. Where a given passageway 82 is not to be utilized, the blow in door 30, therefor, would be locked in its closed position during reverse thrust operation. It will also be noted that those doors which are opened for reverse thrust, are swung fully inwardly to positions which seal the secondary air passageways, indicated at 86, thus to prevent overtemperaturing of components which are normally cooled by the secondary air.

Reliance may be had on aerodynamic forces for positioning the blow in doors 30, as described, however, there are circumstances where more positive control may be desirable, or necessary, as where only selected passageways 82 are utilized in the reverse thrust mode of operation. The provision of actuators, or other control means, for the blow in doors 30 would be readily accomplished by those working in this art.

Other departures from the embodiment described herein will be apparent to those skilled in the art within the spirit and context of the present inventive concepts. The scope of the present invention is, therefore, to be derived solely from the following claims.

Having thus described the invention, what is claimed as novel and desired to be secured by Letters Patent of the United States is:

1. A propulsion nozzle for receiving a motive fluid stream and discharging same to produce a propulsive force, said nozzle comprising, in series flow relationship:

a variable geometry, primary nozzle;

a variable ejector having a plurality of flaps mounted at their upstream ends and aerodynamically aligned to form a continuous surface when the propulsion nozzle is positioned in its supersonic operation and subsonic operation configurations;

a variable geometry, secondary nozzle;

said propulsion nozzle further comprising means for introducing secondary air at the upstream end of the variable ejector;

means for selectively introducing tertiary air into the upstream end of the secondary nozzle;

means for positioning said propulsion nozzle in a supersonic operation configuration wherein the secondary nozzle is divergent and the variable ejector is closely spaced from the primary and secondary nozzles and divergently aligned, generally with the secondary nozzle to thus comprise a positive expansion surface for the motive fluid stream as it is discharged from the primary nozzle; and means for positioning said propulsion nozzle in a subsonic operation configuration wherein the secondary nozzle is generally parallel with the propulsion nozzle axis, tertiary air is introduced into the secondary nozzle, and the variable ejector is reduced in outlet area and guides secondary and tertiary air into generally parallel flow relationship with the motive fluid stream discharge from the primary nozzle, thereby aerodynamically neutralizing the variable ejector and the secondary nozzle.

2. A propulsion nozzle as in claim 1 wherein the variable ejector is displaceable to a position spaced downstream from the primary nozzle and in blocking relation to the motive fluid stream discharge therefrom; and at least a portion of the tertiary air introducing means are open for the discharge therefrom of the blocked motive fluid stream, thereby producing reverse thrust.

3. A propulsion nozzle as in claim 1 further comprising a surrounding pod structure supporting the secondary nozzle and further wherein the means for selectively introducing tertiary air comprise a plurality of passageways spaced around said pod structure, each passageway extending from the exterior of the pod structure, rearwardly and inwardly, to the secondary nozzle, and blow in doors pivotal from sealing positions, flush with the exterior of the pod structure, to inwardly angled positions in which said passageways are open for the introduction of tertiary air, and the plurality of flaps pivotally mounted at thier upstream ends are generally aligned with the inner ends of the blow in doors when the latter are swung inwardly for the introduction of tertiary air during subsonic operation.

4. A propulsion nozzle as in claim 3 wherein the variable ejector comprises an actuation ring on which the flaps thereof are pivotally mounted and means are provided for pivoting said flaps relative to said actuation ring and said ejector flaps are slightly convergent when the propulsion nozzle is positioned in its subsonic operation configuration.

5. A propulsion nozzle as in claim 4 wherein the means for pivoting the variable ejector flaps comprise links pivotally connected, at their inner ends, to said ejector falps and pivotally connected, at their outer ends, to said pod structure in spaced relationship therearound, thereby supporting said variable ejector, and actuator means for pivoting said links relative to the pod structure to thus pivot said ejector flaps relative to said actuation ring, as well as to displace said actuation ring in an axial direction.

6. A propulsion nozzle as in claim 5 wherein the variable ejector comprises sealing flaps pivotally mounted on said actuation ring in alternating relation with the link-connected flaps and aerodynamically aligned therewith to form a continuous surface when the propulsion nozzle is positioned in its supersonic operation and subsonic operation configurations, and the variable ejector actuator means has sufficient stroke to displace the variable ejector into spaced, downstream relationship from the primary nozzle and also swing the link-connected flaps thereof away from said sealing flaps and into blocking relationship relative to the motive fluid stream discharge from the primary nozzle, and further wherein at least a portion of the blow in doors are swung inwardly to permit discharge of the blocked, motive fluid stream through the pod structure passageways, to thereby produce reverse thrust.

7. A propulsion nozzle as in claim 6 wherein the secondary nozzle comprises, at its inlet end, a fixed portion of said pod structure, the actuation ring sealingly engages said fixed portion when displaced for reverse thrust, and the secondary air introducing means comprises passageways which are blocked off by the blow in doors when the latter are swung to extreme inward positions and the blow in doors are so swung to such extreme positions when the variable ejector is positioned for reverse thrust.

* * * * *